(12) United States Patent
Kim et al.

(10) Patent No.: US 8,926,345 B2
(45) Date of Patent: Jan. 6, 2015

(54) APPARATUS FOR INSERTING/EXTRACTING INSERT TYPE CARD FOR ELECTRONIC DEVICE

(75) Inventors: Sang-Hyeon Kim, Gyeongsangbuk-do (KR); Jong-Yoon Lim, Busan (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 338 days.

(21) Appl. No.: 13/546,321

(22) Filed: Jul. 11, 2012

(65) Prior Publication Data

US 2013/0023136 A1 Jan. 24, 2013

(30) Foreign Application Priority Data

Jul. 21, 2011 (KR) ........................ 10-2011-0072209

(51) Int. Cl.
*H01R 13/44* (2006.01)
*G06K 13/08* (2006.01)

(52) U.S. Cl.
CPC .................................. *G06K 13/0825* (2013.01)
USPC ........................................................ 439/142

(58) Field of Classification Search
USPC .......................................... 439/142, 135, 136
See application file for complete search history.

(56) References Cited

U.S. PATENT DOCUMENTS

| | | | | |
|---|---|---|---|---|
| 4,640,575 A | * | 2/1987 | Dumas ........................... | 385/134 |
| 5,574,625 A | * | 11/1996 | Ohgami et al. .......... | 361/679.09 |
| 5,793,352 A | * | 8/1998 | Greenberg et al. ........... | 345/699 |
| 5,822,183 A | * | 10/1998 | Kanda et al. .............. | 361/679.32 |
| 6,343,945 B1 | * | 2/2002 | Liikanen ........................ | 439/160 |
| 6,510,960 B1 | * | 1/2003 | Christopherson et al. . | 220/345.3 |
| 6,674,639 B2 | * | 1/2004 | Wang et al. .............. | 361/679.32 |
| 6,757,160 B2 | * | 6/2004 | Moore et al. ............. | 361/679.55 |
| 6,790,060 B1 | * | 9/2004 | Chiang ......................... | 439/142 |
| 6,991,490 B1 | * | 1/2006 | Su ................................. | 439/521 |
| 7,048,556 B2 | * | 5/2006 | Stanton et al. ................ | 439/135 |
| 7,074,061 B1 | * | 7/2006 | Roth et al. .................... | 439/131 |
| 7,104,817 B2 | * | 9/2006 | Shiue et al. ................... | 439/137 |
| 7,273,383 B1 | * | 9/2007 | Bennett ......................... | 439/142 |
| 7,309,016 B2 | * | 12/2007 | Lev et al. .................. | 235/472.01 |
| 7,364,473 B2 | * | 4/2008 | Ohta ............................. | 439/694 |
| 7,382,612 B2 | * | 6/2008 | Chan et al. ............... | 361/679.41 |
| 7,500,866 B2 | * | 3/2009 | Gennai et al. ................. | 439/367 |
| 7,611,371 B2 | * | 11/2009 | Guo .............................. | 439/367 |
| 7,746,635 B2 | * | 6/2010 | Lu ............................ | 361/679.55 |
| 7,850,371 B2 | * | 12/2010 | Riley et al. ...................... | 385/77 |
| 7,946,866 B2 | * | 5/2011 | Bernstein et al. ............ | 439/136 |
| 8,025,510 B2 | * | 9/2011 | Bolshakov et al. ........... | 439/136 |
| 8,090,408 B2 | * | 1/2012 | Ochi et al. .................... | 455/558 |
| 8,100,485 B2 | * | 1/2012 | Ogasawara et al. ........... | 312/294 |
| 8,107,227 B2 | * | 1/2012 | Long et al. ............... | 361/679.01 |
| 8,142,217 B2 | * | 3/2012 | Lin et al. ....................... | 439/344 |

(Continued)

FOREIGN PATENT DOCUMENTS

JP 2006-119881 A 5/2006

*Primary Examiner* — Neil Abrams
(74) *Attorney, Agent, or Firm* — Cha & Reiter, LLC (57) ABSTRACT

An apparatus for inserting/extracting an insert type card for an electronic device using a card cover includes: a card insert slot formed in the electronic device; a card cover installed in the card insert slot; and at least one card inserting/extracting portion formed at a circumference of the card insert slot, wherein the card inserting/extracting portion includes a groove that allows an end of the card cover to be used to push the insert type card into the card insert slot.

20 Claims, 5 Drawing Sheets

(56) References Cited

U.S. PATENT DOCUMENTS

| | | | |
|---|---|---|---|
| 8,186,726 B2* | 5/2012 | Zuo | 292/57 |
| 8,199,464 B2* | 6/2012 | Zuo et al. | 361/679.01 |
| 8,199,470 B2* | 6/2012 | Yang | 361/679.02 |
| 8,213,162 B2* | 7/2012 | Huang | 361/679.01 |
| 8,218,314 B2* | 7/2012 | Yang et al. | 361/679.58 |
| 8,244,302 B2* | 8/2012 | Fujino et al. | 455/558 |
| 8,251,409 B2* | 8/2012 | Chang et al. | 292/137 |
| 8,430,680 B2* | 4/2013 | Sun et al. | 439/217 |
| 8,435,054 B2* | 5/2013 | Liu | 439/142 |
| 8,446,125 B2* | 5/2013 | Mkhitarian | 320/112 |
| 8,636,525 B2* | 1/2014 | Sobig et al. | 439/136 |
| 8,662,905 B2* | 3/2014 | Chang | 439/142 |
| 8,665,585 B2* | 3/2014 | Ko | 361/679.02 |
| 8,711,568 B2* | 4/2014 | Evens | 361/728 |
| 2013/0023136 A1* | 1/2013 | Kim et al. | 439/153 |
| 2013/0114225 A1* | 5/2013 | Schack et al. | 361/781 |
| 2014/0038441 A1* | 2/2014 | Chen et al. | 439/136 |
| 2014/0065860 A1* | 3/2014 | Wang | 439/136 |
| 2014/0080334 A1* | 3/2014 | Tetsuya | 439/136 |
| 2014/0106584 A1* | 4/2014 | Huang | 439/131 |
| 2014/0134859 A1* | 5/2014 | Lee et al. | 439/136 |

* cited by examiner

APPARATUS FOR INSERTING/EXTRACTING INSERT TYPE CARD FOR ELECTRONIC DEVICE

CLAIM OF PRIORITY

This application claims the priority under 35 U.S.C. §119 (a) of an application entitled "Apparatus for Inserting and Extracting Insert Type Card for Electronic Device" filed in the Korean Intellectual Property Office on Jul. 21, 2011 and assigned Serial No. 10-2011-0072209, the contents of which are hereby incorporated by reference.

BACKGROUND OF THE INVENTION

1. Field of the Invention

The present invention relates to an apparatus for inserting/extracting an insert type card to/from an electronic device, and more particularly to an apparatus for inserting/extracting an insert type card using a card cover.

2. Description of the Related Art

In general, electronic devices typically include portable communication devices, liquid crystal display devices, computers, portable electronic calculators, and battery packs.

A portable communication device enables mobile voice and data communications with a counterpart and includes an antenna unit, a data input/output unit, a data transmitting/receiving unit. The data input unit generally includes a keypad through which data can be input mainly by a pushing operation of a finger, and a touchpad or a touch screen are often used as the keypad.

The conventional portable communication device has evolved to have multiple functions according to various demands of users. For example, the multiple functions include voice communication, a radio set playing function, a digital camera function, an internet function, and a function for downloading and recreating MP3 music and videos. Such music and video files have large file sizes, and additionally require a memory card such as a secure digital (SD) card, a multimedia card (MMC), and a subscriber identification module (SIM) card. The memory card is inserted into and extracted from the portable communication device during operation.

Figure 1:
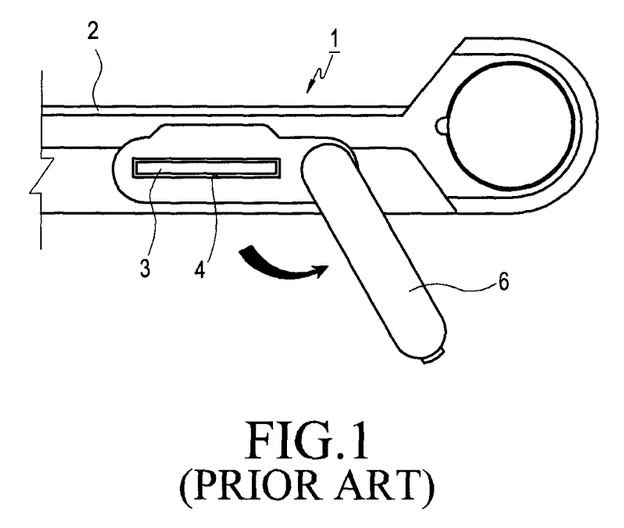
FIG. 1 is a front view illustrating a conventional memory card inserting/extracting apparatus for an electronic device.
Figure 2:
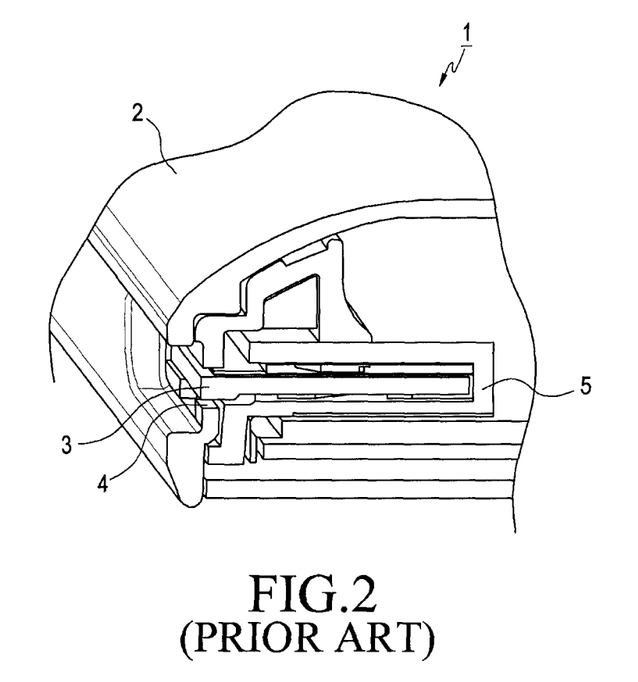
FIG. 2 is a partially cutaway perspective view illustrating an operational state of the conventional memory card inserting/extracting apparatus.

As illustrated in FIGS. 1 and 2, a conventional memory card inserting/extracting apparatus 1 for a portable communication device includes a card insert slot 4 formed in a communication device body 2 and through which a memory card 3 is inserted and extracted, a push-pull card socket 5 installed inside the card insert slot 4, and a card cover 6 installed in the communication device body 2 and configured to prevent foreign substances from being introduced into the card insert slot 4.

As shown, when the memory card 3 is to be inserted into the communication device body 2, the card cover 6 installed in the communication device body 2 is manually pulled out and rotated to open the card insert slot 4. In this state, the memory card 3 is inserted into the card insert slot 4, and then is inserted into the push-pull card socket 5 while being pushed, thus making an electrical contact with the push-pull card socket 5.

Thereafter, when the memory card 3 is to be extracted from the card insert slot 4, if the inserted memory card 3 is pushed again using a fingernail of a user or a tool (not shown), it is automatically extracted from the card insert slot 4 by the push-pull card socket 5.

Such a memory card inserting/extracting apparatus is disclosed in Japanese Patent Application Publication No. 2006-119881 (published on May 11, 2006). However, since the conventional memory card inserting/extracting apparatus for an electronic device has a structure, it is difficult to extract the memory card without using a fingernail of a user or a separate tool.

Thus, there is a need for an improved apparatus for inserting/extracting a memory card into/from a card insert slot even without using a fingernail of a user or a separate tool.

SUMMARY OF THE INVENTION

Accordingly, the present invention has been made to solve the above-mentioned problems occurring in the prior art and provides additional advantages, by providing an apparatus for inserting/extracting an insert type card for an electronic device which allows a user to insert or extract the insert type card without using a fingernail of the user or a separate tool. This is achieved by configuring a card inserting/extracting portion such that the insert type card can be inserted or extracted using a card cover installed in a card insert slot, thus making it easy to insert or extract the insert type card.

In accordance with an aspect of the present invention, an apparatus for inserting/extracting an insert type card for an electronic device includes: a card insert slot formed in the electronic device; a card cover installed in the card insert slot; and at least one card inserting/extracting portion formed at a circumference of the card insert slot, wherein the card inserting/extracting portion allows the card cover to push in thereto the insert type card.

In accordance with another aspect of the present invention, a terminal having an insert type card includes: a housing having a card insert slot to receive the insert type card, a card cover rotatably coupled to the card insert slot to selectively open and close the card insert slot, and at least one card inserting/extracting portion formed on the card insert slot to receive one end of the card cover when the insert type card is being pushed by the card cover.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, exemplary embodiments of the present invention will be described with reference to the accompanying drawings. It should be understood that the configurations described herein and illustrated in the drawings are merely the embodiments of the present invention and may be replaced by various modifications as of the time when the application is filed.

Referring to FIGS. 3 to 9, an apparatus 10 for inserting/extracting an insert type card for an electronic device includes a card insert slot 20, a card socket 30, a card cover 40, and one or more card inserting/extracting portions 50. The card insert slot 20 is formed at a circumference of an outskirt of the electronic device 11 such that the insert type card 60 can be inserted into and extracted from the card insert slot 20. The card socket 30 is installed inside the card insert slot 20 such that the insert type card 60 can be inserted into and extracted from the card insert slot 20 as the insert type card 60 is pushed. The card cover 40 is installed at a position adjacent to the card insert slot 20 to selectively open and close the card insert slot 20. The card inserting/extracting portions 50 are formed at a circumference of the card insert slot 20 such that the insert type card 60 can be inserted into and extracted from the card insert slot 20 by means of the card socket 30 when the insert type card 60 is pushed using the opened card cover 40.

The above insert type card 60 is one of various external memory cards, a secure digital (SD) card, a multimedia card (MMC), a personal information card, a check card, and a subscriber identification module (SIM) card, but may be any suitable insert type external card capable of storing large data.

As illustrated in FIGS. 3 to 9, the card cover 40 has a coupling portion 41 which passes through and is coupled to a coupling hole 21 formed in the card insert slot 20. The coupling portion 41 is made of a resilient material so that the card cover 40 can be extended and rotated by a resiliency of the coupling portion 41. The resilient material is a rubber, but may be any suitable material other than a rubber. (For example, silicon)

As illustrated in FIGS. 3 to 5, 8, and 9, the card socket 30 is a push-pull card socket 30 so that the insert type card 60 can be inserted and extracted when pushed.

As illustrated in FIGS. 3 to 9, each of the card inserting/extracting portions 50 has at least one insert groove to guide the card cover 40 so that the insert type card 60 can be pushed into the card socket 30 passing the outer edge thereof when being inserted.

Hereinafter, an operation of the apparatus for inserting/extracting an insert type card for an electronic device according to the embodiment of the present invention will be described in more detail. Referring to FIGS. 3 to 9, the apparatus 10 for inserting/extracting an insert type card for an electronic device includes a card insert slot 20, a card socket 30, a card cover 40, and one or more card inserting/extracting portions 50.

Figure 3:
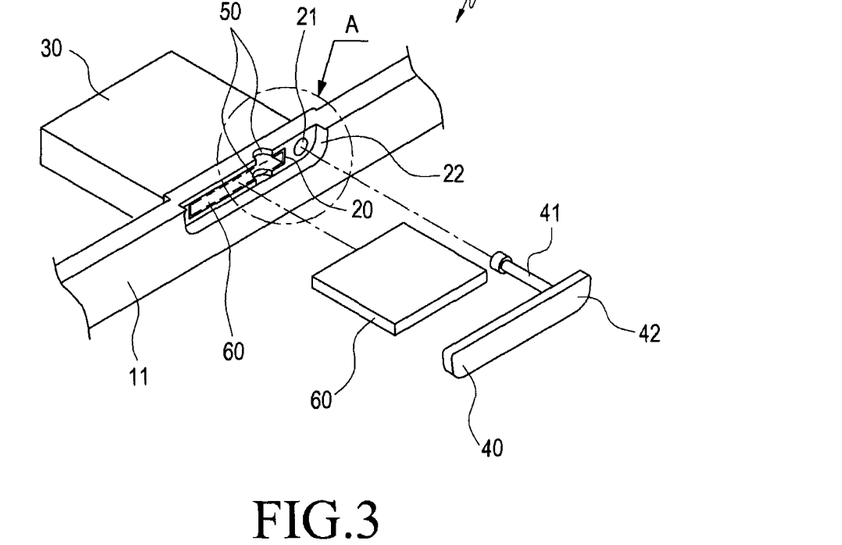
FIG. 3 is an exploded perspective view illustrating an apparatus for inserting/extracting an insert type card for an electronic device according to an embodiment of the present invention.
Figure 4:
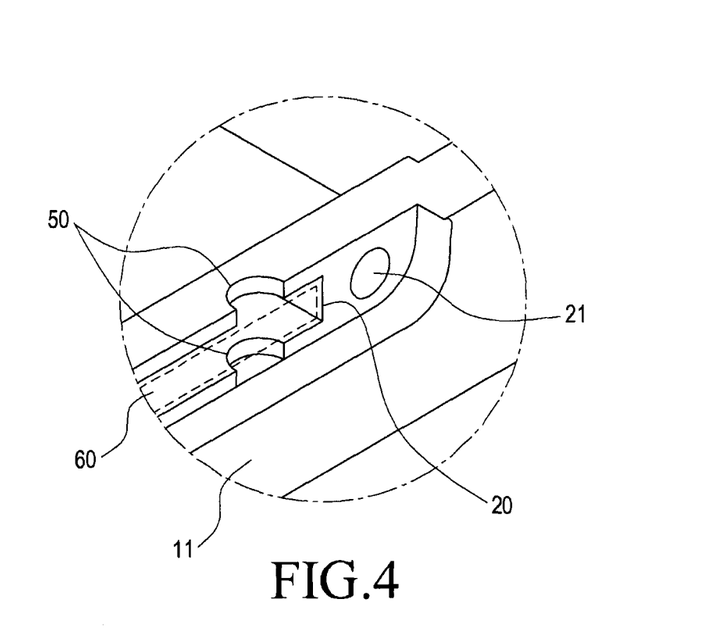
FIG. 4 is an enlarged exploded perspective view illustrating portion A of FIG. 3.
Figure 5:
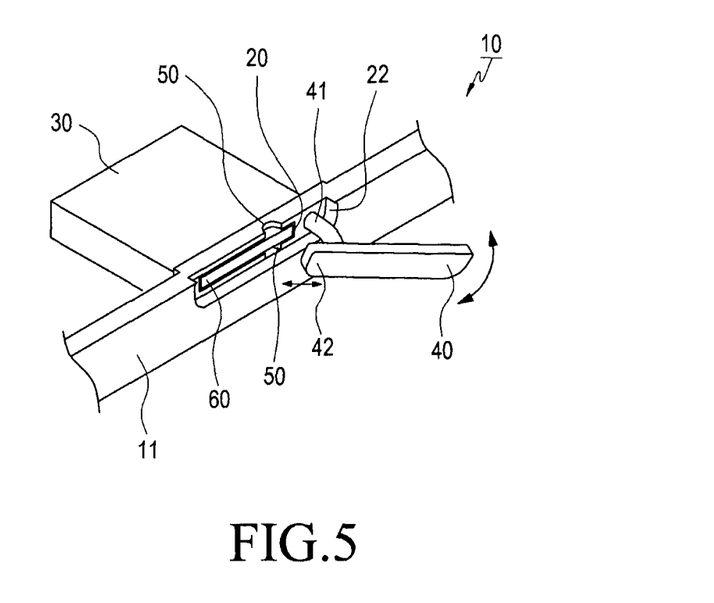
FIG. 5 is a perspective view illustrating an operation of the apparatus for inserting/extracting an insert type card for an electronic device according to the embodiment of the present invention.

As illustrated in FIGS. 3 to 5, the card insert slot 20 is formed at a circumference of an outskirt of the electronic device 11, and a card socket 30 is installed inside the card insert socket 20. The card inserting/extracting portions 50 are formed at a circumference of the card insert slot 20.

In this state, as illustrated in FIGS. 3 to 9, since the coupling portion 41 passing through and coupled to the coupling hole 21 formed in the card insert slot 20 is formed in the card cover 40, the coupling portion 41 of the card cover 40 extends through the coupling hole 21 of the card insert slot 20 and is rotatably coupled to the coupling hole 21 of the card insert slot 20. The card cover 40 is positioned in a card positioning portion 22 formed in the card insert slot 20 to close the card insert slot 20.

Figure 8:
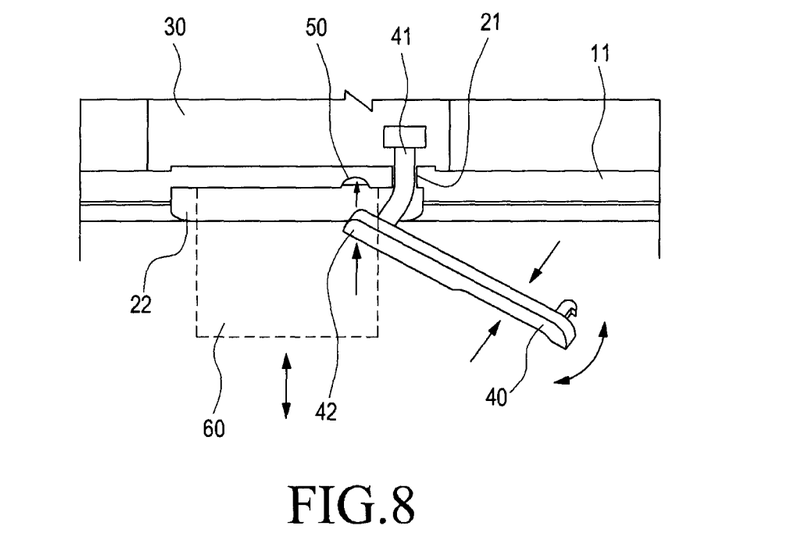
FIG. 8 is a plan view illustrating a procedure of operating the apparatus for inserting/extracting an insert type card for an electronic device according to the embodiment of the present invention.
Figure 9:
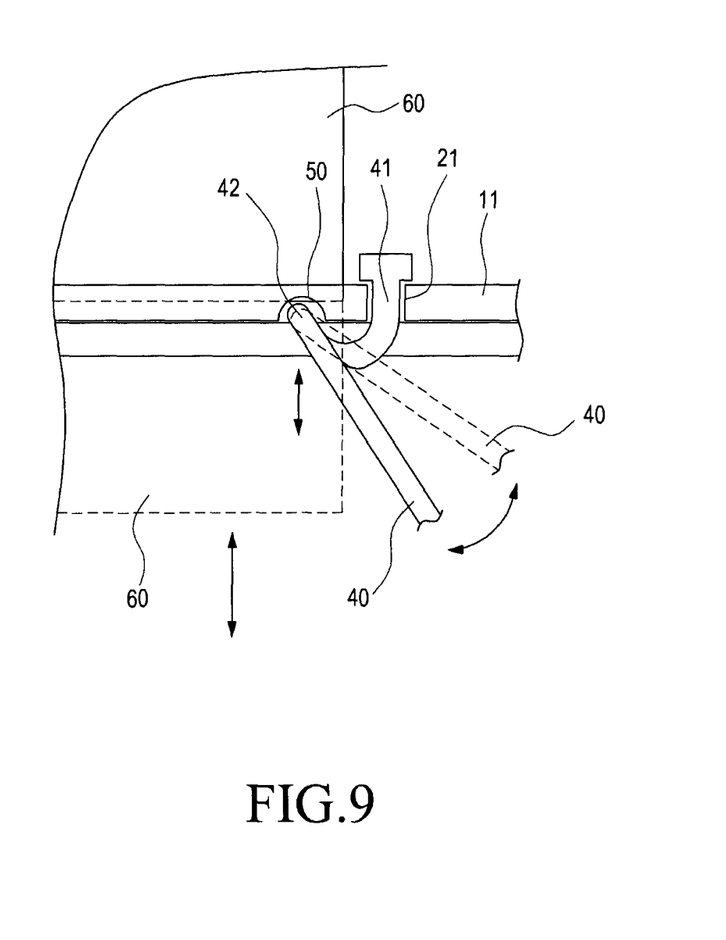
FIG. 9 is a plan view illustrating operational states of the apparatus for inserting/extracting an insert type card for an electronic device according to the embodiment of the present invention.

In this state, as illustrated in FIGS. 8 and 9, when the insert type card 60 is extracted from the card insert slot 20, the card cover 40 is separated from the card positioning portion 22 of the card insert slot 20 first and the card insert slot 20 is opened at the same time.

Figure 6:
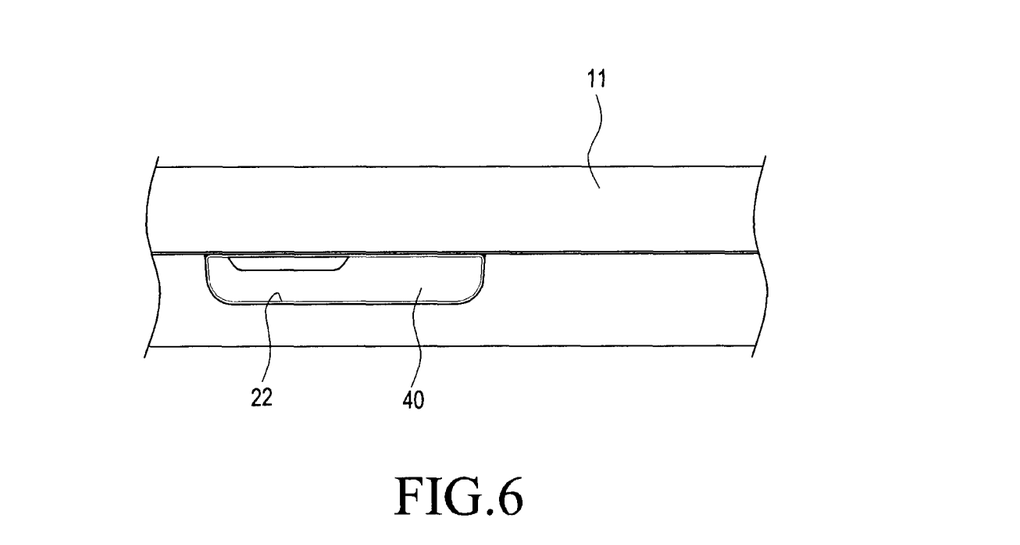
FIG. 6 is a front view illustrating a state where the apparatus for inserting/extracting an insert type card for an electronic device according to the embodiment of the present invention is not operated yet.
Figure 7:
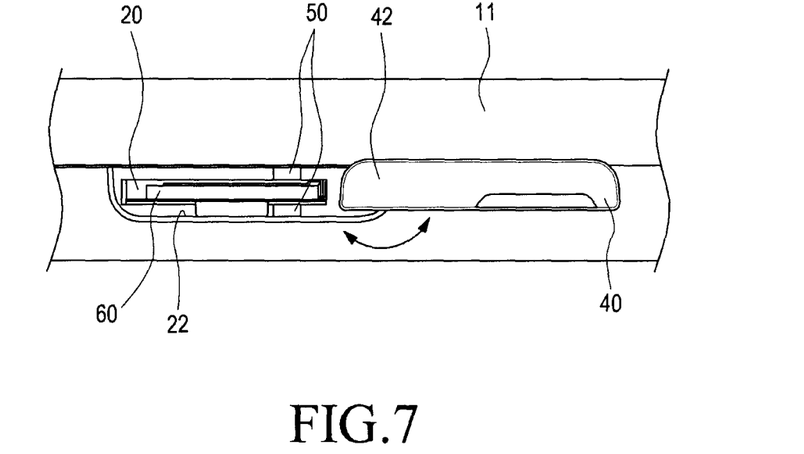
FIG. 7 is a front view illustrating a state where the apparatus for inserting/extracting an insert type card for an electronic device according to the embodiment of the present invention has been operated.

Then, as illustrated in FIGS. 5 to 7, the card cover 40 is rotated from the card insert slot 20 by means of the coupling portion 41.

In this state, as illustrated in FIGS. 8 and 9, the card cover 40 is pulled while being gripped, and is extended by the resilient force of the coupling portion 41. Then, one end 42 of the card cover 40 is inserted into the card inserting/extracting portion 50, and is guided to the insert type card 60 by means of the card inserting/extracting portions 50.

As illustrated in FIGS. 8 and 9, one end 51 of the card cover 40 contacts the insert type card 60 installed within the card insert slot 20, in which state if the end 42 of the card cover 40 is pushed, the end 42 of the card cover 40 is guided and inserted into the card inserting/extracting portions 50 by a predetermined depth.

Then, as illustrated in FIG. 9, the end 42 of the card cover 40 pushes the insert type card 60 into the card insert slot 20 by a predetermined depth and then projects the insert type card 60 from the card insert slot 20. The insert type card 60 projects by means of the card socket 30 and then is extracted from the card insert slot 20.

As illustrated in FIGS. 3, 4, 8, and 9, the card inserting/extracting portions 50 are insert grooves and serve to guide and insert the end 42 of the card cover 40 by a predetermined depth.

In this case, as illustrated in FIGS. 6 and 7, when the insert type card 60 is to be inserted into the card insert slot 20 again, it is inserted into the card insert slot 20 first.

In this state, as illustrated in FIG. 9, in a state where the end 51 of the card cover 40 contacts the insert type card 60 with the card cover 40 being gripped, the card cover 40 is pushed so that the insert type card 60 is pushed and inserted into the card insert slot 20. Then, the end 41 of the card cover 40 is pushed to the card inserting/extracting portions 50 to be inserted.

As illustrated in FIG. 6, the card inserting/extracting portions 50 guide the end 42 of the card cover 40 so that the card cover 40 can be inserted, and the insert type card 60 is inserted into the card insert slot 20 again. In this state, the card cover 40 is rotated to be positioned in the card positioning portion 22 again, and the card insert slot 20 is closed again.

As described above, since the card inserting/extracting portions 50 are configured such that the end 42 of the card cover 40 which has been rotated and opened is guided and inserted, and the insert type card 60 is inserted and extracted by pushing the insert type card 60, the insert type card 60 can be inserted and extracted without using a fingernail of a user or a separate tool, thereby making it easy to insert and extract the insert type card 60.

Further, the apparatus 10 for inserting/extracting an insert type card according to the embodiment of the present invention can be applied to an electronic device as a representative example. However, it is not limited only to an electronic device, but may be applied to various types of products which require an apparatus for inserting/extracting an insert type card.

Examples of the electronic device 11 according to the embodiment of the present invention include all mobile communication terminals operated based on communication protocols corresponding to various communication systems, all information and communication devices such as a portable multimedia player (PMP), an MP3 player, a navigation system, a gaming device, a laptop computer, an advertising panel, a TV, a digital broadcasting player, a personal digital assistant (PDA), a smart phone, electronic devices and multimedia devices, and application devices thereof.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An apparatus for inserting/extracting an insert type card for an electronic device, comprising:
    a card insert slot formed in the electronic device;
    a card cover installed within the card insert slot; and
    at least one card inserting/extracting portion formed at a receiving end of the card insert slot,
    wherein the card inserting/extracting portion receives one end of the card cover as the insert type card is pushed in by the one end of the card cover.

2. The apparatus as claimed in claim 1, wherein the insert type card is one of an external memory card, a secure digital (SD) card, a multimedia card (MMC), a personal information card, a check card, and a subscriber identification module (SIM) card.

3. The apparatus as claimed in claim 1, further comprising a coupling portion formed in the card cover to pass through and be rotatably coupled to a coupling hole formed in the card insert slot.

4. The apparatus as claimed in claim 3, wherein the coupling portion of the card cover is made of a resilient material so that the card cover is extended and rotated by a resilient force of the coupling portion.

5. The apparatus as claimed in claim 4, wherein the resilient material is a rubber.

6. The apparatus as claimed in claim 1, wherein a push-pull card socket is installed within the card insert slot to insert and extract the insert type card.

7. The apparatus as claimed in claim 1, wherein the card inserting/extracting portion of the card insert slot comprises at least one insert groove which guides and inserts the card cover so that the insert type card is pushed.

8. The apparatus as claimed in claim 1, wherein the electronic device is one of a portable communication device, an MP3 player, a navigation system, a gaming device, a laptop computer, an advertising panel, a TV, a digital broadcasting player, a PDA, and a smart phone.

9. An apparatus for inserting/extracting an insert type card for an electronic device, the apparatus comprising:
    a card insert slot formed in the electronic device;
    a card socket installed within the card insert slot;
    a card cover rotatably installed in the card insert slot; and
    at least one card inserting/extracting portion formed at a circumference of the card insert slot such that the card inserting/extracting portion allows the card cover to push the insert type card therein by a predetermined depth so that the insert type card is inserted into or extracted from the card insert slot by means of the card socket.

10. The apparatus as claimed in claim 9, wherein the insert type card is one of an external memory card, a secure digital (SD) card, a multimedia card (MMC), a personal information card, a check card, and a subscriber identification module (SIM) card.

11. The apparatus as claimed in claim 1, further comprising a coupling portion formed on the card cover to rotatably engages a coupling hole formed in the card insert slot.

12. The apparatus as claimed in claim 11, wherein the coupling portion of the card cover is made of a resilient material so that the card cover is extended and rotated by a resilient force of the coupling portion.

13. The apparatus as claimed in claim 12, wherein the resilient material is a rubber.

14. The apparatus as claimed in claim 9, wherein the card inserting/extracting portion of the card insert slot comprises at least one insert groove.

15. A terminal having an insert type card:
    a housing having a card insert slot to receive the insert type card;
    a card cover rotatably coupled to the card insert slot to selectively open and close the card insert slot; and
    at least one card inserting/extracting portion formed on the card insert slot to receive one end of the card cover when the insert type card is being pushed in by the card cover.

16. The terminal as claimed in claim 15, wherein the insert type card is one of an external memory card, a secure digital (SD) card, a multimedia card (MMC), a personal information card, a check card, and a subscriber identification module (SIM) card.

17. The terminal as claimed in claim 15, further comprising a coupling portion formed on the card cover to rotatably engages a coupling hole formed in the card insert slot.

18. The terminal as claimed in claim 17, wherein the coupling portion of the card cover is made of a resilient material so that the card cover is extended and rotated by a resilient force of the coupling portion.

19. The terminal as claimed in claim 18, wherein the resilient material is a rubber.

20. The terminal as claimed in claim 15, wherein the card inserting/extracting portion of the card insert slot comprises at least one insert groove.

\* \* \* \* \*

UNITED STATES PATENT AND TRADEMARK OFFICE
CERTIFICATE OF CORRECTION

PATENT NO.        : 8,926,345 B2
APPLICATION NO.   : 13/546321
DATED             : January 6, 2015
INVENTOR(S)       : Sang-Hyeon Kim et al.

Page 1 of 1

It is certified that error appears in the above-identified patent and that said Letters Patent is hereby corrected as shown below:

In the Claims

Column 6, Claim 11, Line 22 should read as follows:
--...engage a coupling hole...--

Column 6, Claim 17, Line 47 should read as follows:
--...engage a coupling hole...--

Signed and Sealed this
Seventh Day of April, 2015

Michelle K. Lee
*Director of the United States Patent and Trademark Office*